(12) United States Patent
Yadav et al.

(10) Patent No.: US 11,271,797 B2
(45) Date of Patent: Mar. 8, 2022

(54) CELL ACCESSIBILITY PREDICTION AND ACTUATION

(71) Applicant: Telefonaktiebolaget LM Ericsson (publ), Stockholm (SE)

(72) Inventors: Niharika Yadav, Bangalore (IN); Paluk Goyal, New Delhi (IN); Aritra Sen, Kolkata (IN); Barjinder Kochar, New Delhi (IN); Amos Kao, Overland Park, KS (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 16/925,242

(22) Filed: Jul. 9, 2020

(65) Prior Publication Data
US 2022/0014424 A1    Jan. 13, 2022

(51) Int. Cl.
*H04L 12/24* (2006.01)
*H04W 24/02* (2009.01)
*H04L 41/0631* (2022.01)
*H04W 24/04* (2009.01)
*G06N 5/04* (2006.01)
*G06N 20/20* (2019.01)

(52) U.S. Cl.
CPC ........... *H04L 41/0636* (2013.01); *G06N 5/04* (2013.01); *G06N 20/20* (2019.01); *H04W 24/04* (2013.01)

(58) Field of Classification Search
CPC ............... H04L 41/0636; H04L 29/06; H04L 29/08072; H04L 29/08981; H04L 41/0806; H04L 41/12; H04L 41/082; H04L 41/0213; H04L 41/22; H04L 43/00; H04L 12/2602; H04W 24/04; H04W 24/02; H04W 24/06; H04W 24/10; H04W 24/08; G06N 5/04; G06N 20/20; G06F 8/65; G06F 9/4416
See application file for complete search history.

(56) References Cited

U.S. PATENT DOCUMENTS 9,439,081 B1 * 9/2016 Knebl ................... H04W 16/18
9,900,790 B1 * 2/2018 Sheen ................. H04L 41/5009
(Continued)

OTHER PUBLICATIONS

Ahmed, et al., "Using Blackbox ML Techniques to Diagnose QoE Problems for an IPTV Service," NOMS 2020, IEEE/IFIP Network Operations and Management Symposium, Budapest, Hungary, Apr. 2020, 8 pages.
(Continued)

*Primary Examiner* — Abdullahi E Salad
(74) *Attorney, Agent, or Firm* — Nicholson, De Vos, Webster & Elliott, LLP (57) ABSTRACT

A method for predicting cell accessibility issues for a mobile network. The method includes receiving a set of metrics from the mobile network, processing a set of key performance indicators (KPIs) derived from the set of metrics in an ensemble machine learning model, the ensemble machine learning model including an RRC model, an RACH model, an ERAB model, and an S1 signaling model to generate at least one cell accessibility degradation prediction and a confidence score, and applying a root cause mapping to the at least one cell accessibility degradation prediction and the confidence score to identify at least one recommended action to correct a correlated cell accessibility issue.

18 Claims, 6 Drawing Sheets

(56) References Cited

U.S. PATENT DOCUMENTS

| | | | | |
|---|---|---|---|---|
| 10,841,853 | B1* | 11/2020 | Yousefi'zadeh | G06N 3/126 |
| 2011/0096678 | A1* | 4/2011 | Ketonen | H04L 41/147 |
| | | | | 370/252 |
| 2014/0269364 | A1* | 9/2014 | Knapp | H04L 41/0823 |
| | | | | 370/252 |
| 2015/0024737 | A1* | 1/2015 | Fox | H04W 24/04 |
| | | | | 455/425 |
| 2017/0026856 | A1* | 1/2017 | Thomas | H04W 24/02 |
| 2017/0034721 | A1* | 2/2017 | Yang | H04W 24/08 |
| 2018/0160327 | A1* | 6/2018 | Serrano Garcia | H04W 24/04 |
| 2018/0302934 | A1* | 10/2018 | Chisu | H04W 76/19 |
| 2020/0213202 | A1 | 7/2020 | Soundrarajan | |
| 2021/0045007 | A1* | 2/2021 | Stawiarski | H04W 28/0289 |
| 2021/0073627 | A1* | 3/2021 | Sarferaz | G06N 20/00 |

OTHER PUBLICATIONS

3GPP, "3rd Generation Partnership Project, Technical Specification Group Services and System Aspects, Management and orchestration, Study on enhancement of Management Data Analytics (MDA)," Release 17, Technical Report, 3GPP TR 28.809, V0.4.0, Jun. 2020, 49 pages.

Huawei, "Add use case and potential solutions of KPI anomaly analysis", 3GPP TSG-SA5 Meeting #131e, S5-203451, e-meeting, May 25-Jun. 3, 2020, 3 pages.

Intel, "pCR on MDA role in management loop", 3GPP TSG-SA5 Meeting #128, S5-197807, Nov. 18, 2019-Nov. 22, 2019, 3 pages.

* cited by examiner

CELL ACCESSIBILITY PREDICTION AND ACTUATION

TECHNICAL FIELD

Embodiments of the invention relate to the field of cellular or mobile communication networks; and more specifically, to a method and system for improving the management and handling of cell accessibility issues in a cellular or mobile communication network.

BACKGROUND ART

Cellular or mobile communication networks (herein after referred to as 'mobile networks') are widely utilized communication networks that enable communication by user equipment (UE) via a wireless link with the remainder of the mobile network, other devices accessible via the mobile network, and other connected networks. Mobile networks are distributed over large geographical areas. The components of the mobile networks that interface with UE via the wireless communication are referred to as "cells," each cell including at least one fixed-location transceiver, but more normally, a set of transceivers referred to as a base transceiver station or base station. The base stations provide access to UEs within the cell to the mobile network, which can be used for transmission of voice, data, and other types of content. A cell typically uses a different set of radio frequencies from neighboring cells, to minimize interference and provide guaranteed service quality within each cell to the UEs. Mobile network operators (MNOs) develop and maintain the mobile networks and contract with subscribers to provide service to their respective UEs.

In mobile networks cell accessibility, i.e., the functional availability of cell resources to the UE, is key operational feature. Management of cell accessibility is important for providing a high quality of service to users by the MNOs. However, in some cases a cell and its resources appear to be functioning normally from the perspective of a network operation center (NOC) engineers even though the user of a UE connected to the cell is experiencing connectivity issues. End users of the UE can be unable to use all or any subset of the services of the impacted cells and in turn the UE may connect to other neighbouring cells thereby overloading these neighbouring cells and impacting the quality of service provided by the neighbouring cells. The cells of a mobile network can have degradation in operation in terms of Random-Access Channel (RACH) success rates, Evolved Universal Telecommunication Systems (UMTS) Terrestrial Radio Access Network (E-UTRAN) Radio Access Bearer (ERAB) success rates, S1 Signalling success rates, and Radio Resource Channel (RRC) success rates. However, degradation of these cell operation metrics is not detected by any detection mechanism and the associated problems are only noticed after user complains of mobile network issues or a sudden increase in the number of UEs continuously reconnecting to a cell (e.g., churners) due to service degradation. As a result, NOC engineers are unable to prevent the occurrence of issues and provide a stable mobile network.

SUMMARY

In one embodiment, a method predicts cell accessibility issues for a mobile network. The method includes receiving a set of metrics from the mobile network, processing a set of key performance indicators (KPIs) derived from the set of metrics in an ensemble machine learning model, the ensemble machine learning model including an (RRC) model, an (RACH) model, an ERAB (model), and an S1 signaling model to generate at least one cell accessibility degradation prediction and a confidence score, and applying a root cause mapping to the at least one cell accessibility degradation prediction and the confidence score to identify at least one recommended action to correct a correlated cell accessibility issue.

In another embodiment, a non-transitory machine-readable storage medium provides instructions that, if executed by a processor, will cause said processor to perform operations receiving a set of metrics from a mobile network, processing a set of KPIs derived from the set of metrics in an ensemble machine learning model, the ensemble machine learning model including an RRC model, an RACH model, an ERAB model, and an S1 signaling model to generate at least one cell accessibility degradation prediction and a confidence score, and applying a root cause mapping to the at least one cell accessibility degradation prediction and the confidence score to identify at least one recommended action to correct a correlated cell accessibility issue.

In a further embodiment, an electronic device predicts cell accessibility issues for a mobile network. The electronic device a machine-readable storage medium having stored there in a cell accessibility predictor, and a processor coupled to the machine-readable storage medium, the processor to execute the cell accessibility predictor, the cell accessibility predictor to receive a set of metrics from the mobile network, process a set of KPIs derived from the set of metrics in an ensemble machine learning model, the ensemble machine learning model including an RRC model, an RACH model, an ERAB model, and an S1 signaling model to generate at least one cell accessibility degradation prediction and a confidence score, and apply a root cause mapping to the at least one cell accessibility degradation prediction and the confidence score to identify at least one recommended action to correct a correlated cell accessibility issue.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for providing a system and method for predicting cell accessibility for user equipment. The embodiments of the cell accessibility prediction system can utilize artificial intelligence to predict the cells in a mobile network that are likely to have cell accessibility issues in the near future. The embodiments, utilize a set of Key Performance Indicators (KPIs) including random access channel (RACH) success rate, Evolved Universal Telecommunication Systems (UMTS) Terrestrial Radio Access Network (E-UTRAN) Radio Access Bearer (ERAB) success rates, S1 signaling success rates, and Radio Resource Channel (RRC) success rates to identify cell resource degradation where these KPIs deviate from their normal values, for example, by a threshold level or difference. The embodiments use Performance Management (PM) counters, Alarms, Traces, Configuration Management (CM) Data, and similar data collected by the mobile network to monitor the cell behavior in different circumstances. The embodiments correlate the performance of important KPIs in a preceding time period (e.g., the past four hours) with the predicted behavior of a corresponding cell in the near future. The embodiments encompass different classification-based machine learning models which focus on different aspects of cell accessibility monitoring that can lead to cell accessibility issues. The embodiments include machine learning models that are trained to predict the cells that demonstrate accessibility issue for a given preceding time period.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The prior art has limitations and disadvantages in providing reliable cell accessibility in mobile networks. The prior art does not provide a mechanism to measure cell accessibility degradation, to predict cell accessibility issues, or to take corrective actions based on these cell accessibility issues. A user of user equipment (UE) can be impacted by cell accessibility issues by not being able to use any mobile network services or make any calls via the UE. A network performance engineer or team may notice a dip in key performance indicators (KPIs) such as RRC success rate and/or ERAB success rate. However, it is likely that the cell accessibility issues are only noticed by the network performance engineer or team after users of the mobile network register complaints with the mobile network operator (MNO). Network operation center engineers then are likely to spend a few hours to analyse the cell accessibility issues to find the root cause. Further time is then spent by the network engineers to resolve the cell accessibility issue. This whole process consumes considerable amount of time and resources during which the user has a poor quality of experience with the mobile network. The embodiments address these deficiencies in the prior art by reducing the time to recognize the cell accessibility issue, as well as analysing the cell accessibility to enable actuation of a response to resolve the cell accessibility issue, which will also ensure that the user receives best quality of service and experience.

The embodiments overcome the limitations and disadvantage of the prior art by providing a cell accessibility prediction system and processes. The cell accessibility prediction system collects mobile network metrics, normalizes the data into a set of key performance indicators, and applies a set of trained machine learning models to each KPI to predict which cells in the mobile network are likely to experience cell accessibility issues in a define time frame. The Key Performance Indicators (KPIs) utilized can include RACH success, ERAB success, S1 Signaling success, and RRC success rates that can be tied cell accessibility degradation when they deviate from their normal threshold values. The embodiments utilize Performance Management (PM) counters, Alarms, Traces, and Configuration Management (CM) data to study the cell behavior in different circumstances. The embodiments correlate the performance of important KPIs in a defined preceding time frame with the corresponding cell's behavior in the near future. The embodiments can encompass different classification-based machine learning models which focus on the different aspects that can each lead to cell accessibility issues. In some embodiments, the machine learning models and overall cell accessibility prediction system and process is trained and design to predict the cells that will show cell accessibility issue four hours in advance.

The embodiments provide advantages over the prior art by use of proactive identification of cell accessibility issues and automated actuation of solutions to address the cell accessibility issues. The embodiments, provide advantages, including optimum utilization of network resources by ensuring network availability is near to full utilization, increased performance of cells by layer balancing, reduction in number of churners due to service improvements, improve quality of service and experience for users, decreased operational expenditures and cost due to improved performance and cell utilization, and additional support and resource utilization for MNOs due to actuation of solutions without manual effort.

The embodiments provide an end to end solution for handling cell accessibility issues, which starts with data collection, and includes feature engineering, model development, root cause mapping, and actuating the recommended actions on the cells that show accessibility degradation due to accessibility issue.

Figure 1:
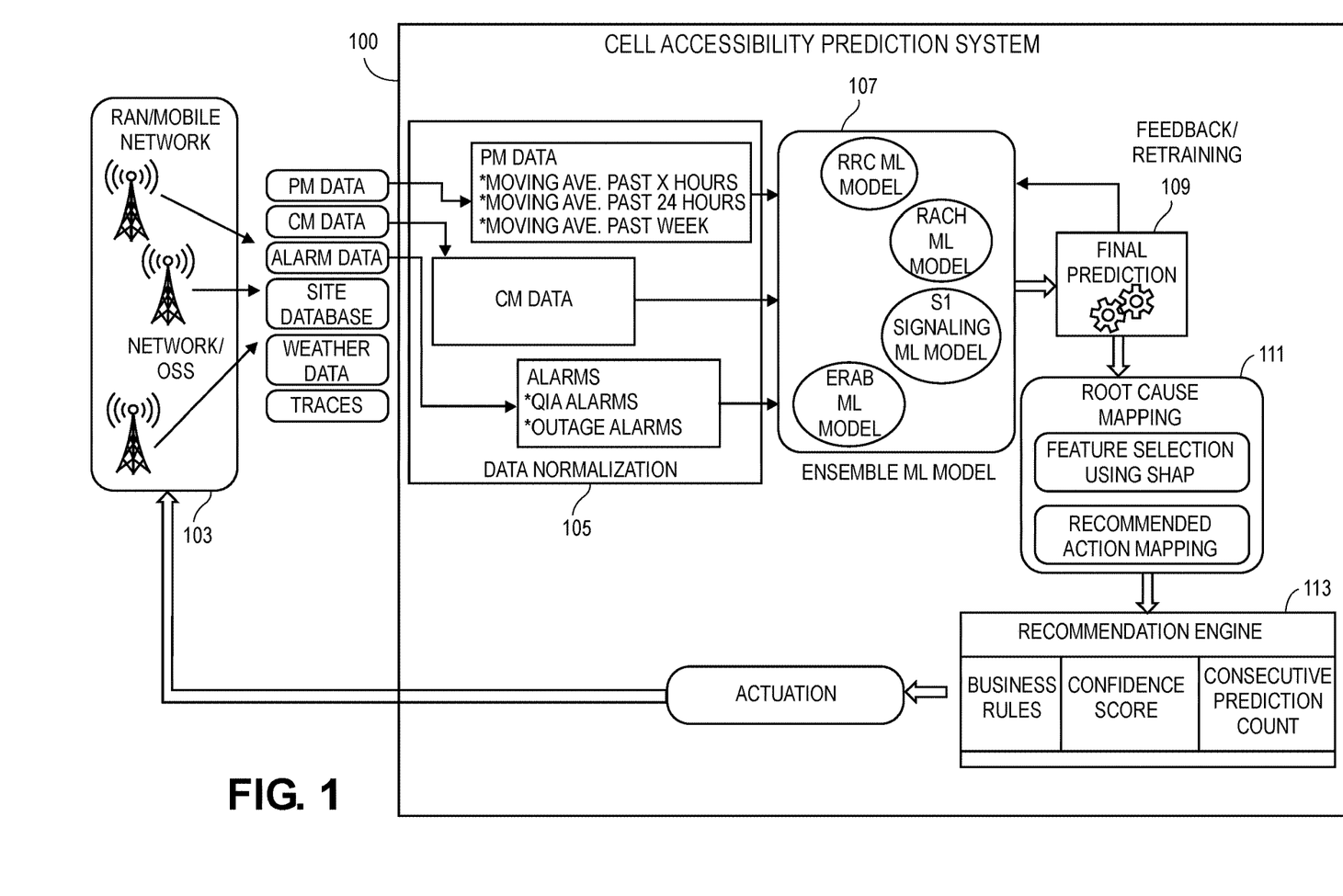
FIG. 1 is a diagram of one embodiment of a cell accessibility prediction system.
Figure 2:
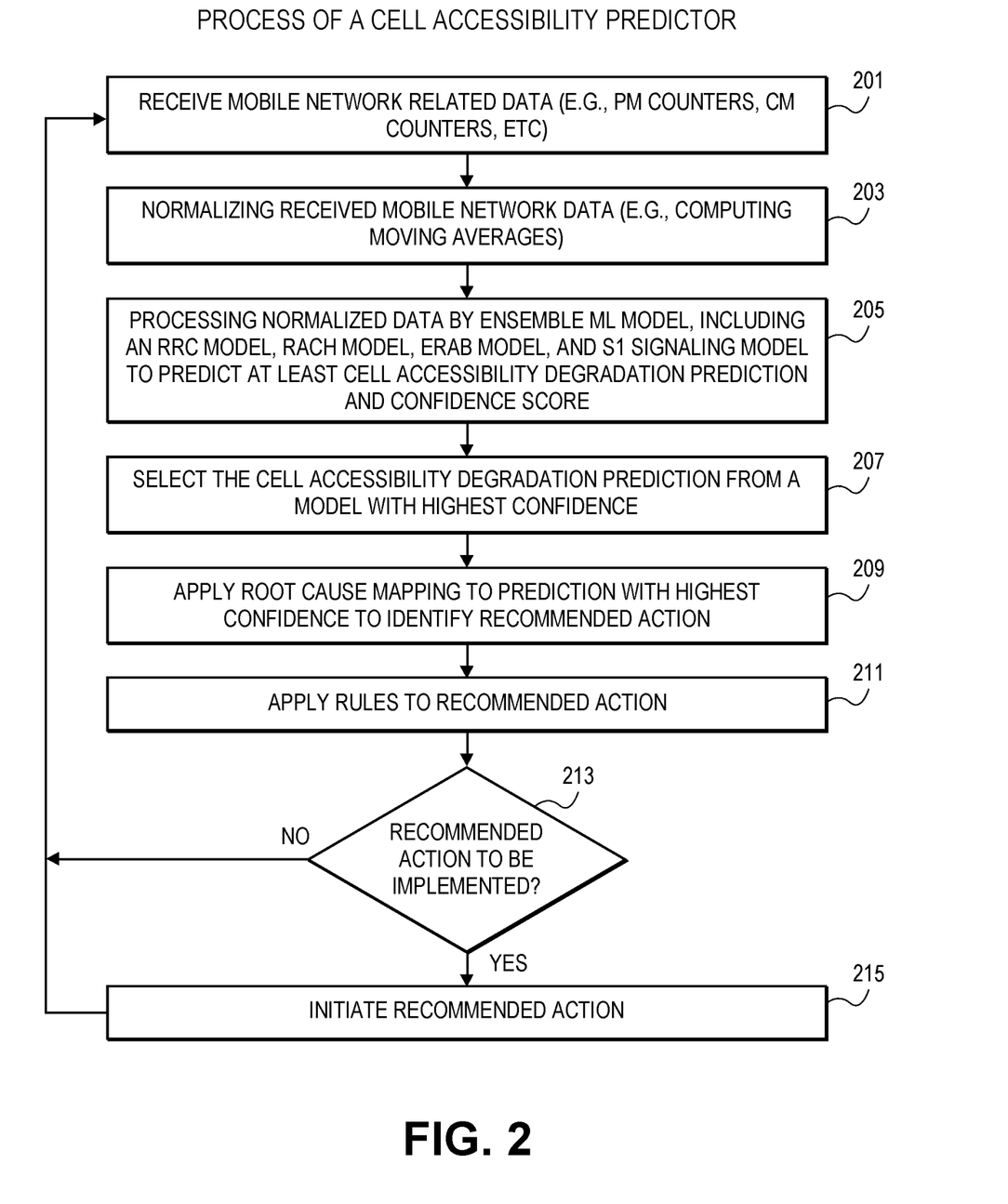
FIG. 2 is a flowchart of one embodiment of a process of a cell accessibility prediction system.

FIG. 1 is a diagram of one embodiment of a cell accessibility prediction system. The components of the cell accessibility prediction system are described in relation to FIG. 1. FIG. 2 is a flowchart of the process of the cell accessibility prediction system. The operations of the components of the cell accessibility prediction system are also described in reference to FIG. 2. The cell accessibility prediction system 100 works in combination with a mobile network 103 and/or radio access network of a mobile network 103. The cell accessibility prediction system can include a data normalization unit 105, ensemble machine learning model 107, prediction unit 109, root cause mapper 111, recommendation engine 113, and actuator 115. The components of the cell accessibility prediction system 100 can be executed by any electronic device or set of electronic devices within or in communication with the mobile network 103. A 'set,' as used herein refers to any positive number of items including one item. The mobile network 103 can include any number of electronic and network devices arrayed to provide mobile communication services to any number of UEs via a radio access network (RAN) or similar wireless communication system. The mobile network architecture can be based on any combination of 5G new radio (NR), 4G long term evolution (LTE), 3rd Generation Partnership Project (3GPP), and similar technologies. The mobile network can collect and generate a number of metrics that can be utilized for assessing cell accessibility (Block 201).

Data from the mobile network 103 can include PM Counters, CM counters, alarms, traces, site database, weather data, and similar data. PM counters can include details of parameters that aid in calculation of KPIs required for the analysis. CM counters can track outliers in the parameters related to accessibility. Alarms can include events containing information about pre-defined outages in the network. For example, Quality Impacting Alarms (QIA), which are defined to capture outages related to quality of service in the network ,can be utilized. QIA alarms can include global positioning system loss of time, voltage standing wave ratio (VSWR) over threshold, clock calibration expiration soon, resource activation timeout, (SFP) stability problem, temporary exceptional out of service, service degraded, radio frequency (RF) reflected power high, loss of tracking, service degraded/service unavailable, and similar QIA alarms. Outage alarms can also be utilized including network time protocol (NTP) server reachability fault, heartbeat failure, public land mobile network (PLMN) service unavailable, service unavailable, configuration requires feature activation, inconsistent configuration, resource allocation configuration, resource allocation failure, resource configuration failure, and similar outage alarms.

A site database provides details of the physical location of the site. Call Trace data can include internal events capturing UE context information and measurement reports. In some cases, trace data can provide user level information that can be used to map to problematic cells in the mobile network 100. Weather data can be data received or accessed from sources internal or external to the mobile network 100 such as specialized weather services that indicate the current weather conditions at different geographic locations. The data can be processed by a data normalization unit 105. The data normalization unit can pre-process the raw metric data that is provided by the mobile network 100 (Block 203). The pre-processing can normalize the data for use by the ensemble machine learning model 107. The data normalization can include computing moving averages of metrics that are used as KPIs. The moving averages can be calculated over any defined length of time or window of time. In some example embodiments, a set of preceding time periods can be utilized. For example, the preceding time period cans be the prior four hours, past day, and/or past week. These time periods can be tracked to provide insights about the impending cell behavior.

Each metric that is input into the ensemble machine learning models 107 can be considered a KPI for the cell accessibility prediction system 100. The cell accessibility prediction system 100 uses a different model for each KPI input into the ensemble machine learning model 107 (Block 205). The cell accessibility prediction system 100 operates on the principle that there are various conditions that can lead to cell accessibility issues. The ensemble machine learning model that is composed of multiple models for the different KPIs represents a multiclass classification-based approach that is able to capture data variations across multiple KPIs. Using the multiple models for processing the individual KPIs better correlates with cell accessibility issues to provide more specific and accurate information about a cell accessibility issue. The degradation of KPI values can be tied to root causes related to the cell accessibility issues enabling the identification of actuate-able solutions. The embodiments of the cell accessibility prediction system are focused on several KPI values linked to cell accessibility degradation. An ensemble ML model 107 is used that is composed of several machine learning models specific to each KPI. These machine learning models can be any type of machine learning algorithm, such as linear regression, logistic regression, decision tree, support vector machine (SVM), Naive Bayes, k nearest neighbors (kNN), random forest, K-means, dimensionality reduction algorithms, gradient boosting algorithms, and similar processes. In some embodiments, a set of different classification algorithms, trained on specific features are utilized. For example, a combination of any one or more of XGBoost, random forest, long short-term memory (LSTM), and Lightgbm can be utilized.

The ensemble machine learning (ML) model 107 operates on the principle that the cell accessibility issue occurs when there is degradation in RRC, RACH, ERAB or S1 signaling related KPIs. The RRC, RACH, ERAB and S1 signalling metrics and functions are those associated with the operation of $3^{rd}$ generation partnership project (3GPP) mobile networks including those implementing $4^{th}$ generation long term evolution (LTE) and $5^{th}$ generation new radio technologies. In order to address all these degradation possibilities, different ML models are developed. In one example embodiment, the models include an RRC_Feature_Trained_Model, a RACH_Feature_Trained_Model, an ERAB_Feature_Trained_Model, and an S1_Signalling_Feature_Trained-_Model. Each model focuses on specific features and learns the patterns of the KPIs in the mobile network 100 during a training phase. Every model is built to corelate the cell behavior with the varying KPI values and provide prediction for cells where threshold values are expected to be breached in an upcoming time frame (e.g., in the next 1-4 hours). The output of each model can be a binary prediction of an upcoming cell accessibility issue and a confidence interval or rating.

The prediction unit 109 can receive the outputs of the ensemble ML model 107 and process them to determine assess the different outputs. The prediction unit 109 can also send feedback or training data back to the ensemble ML model 107. The feedback or training data can include input features along with the responses generated by the ML models. The prediction unit 109 can assess the important features that led to each prediction of the ensemble ML model 107 based on the probability by which each ML model produced the respective outcome. Amongst the four deployed ML models, the ML model with the highest probability of target class (i.e. the outcome of a binary classification) is chosen and future analysis of identifying the actual root cause is conducted on the features of that model. In case the models have equal confidence scores, a tie breaking scheme can be utilized to select one of the model outputs for determination of the primary root cause. In one example, the order used to select the primary root cause can be RACH>RRC>ERAB>S1. Where the '>' indicates relative order of preference with RACH success rate having a highest preference and the S1 signaling success being the least preferred. The prediction unit 109 outputs a selection of the cell accessibility issues to be root cause mapped based on highest confidence level (Block 207). In other embodiments, one or more of the cell accessibility issues that identified can be presented to the root cause mapper 111.

Figure 3:
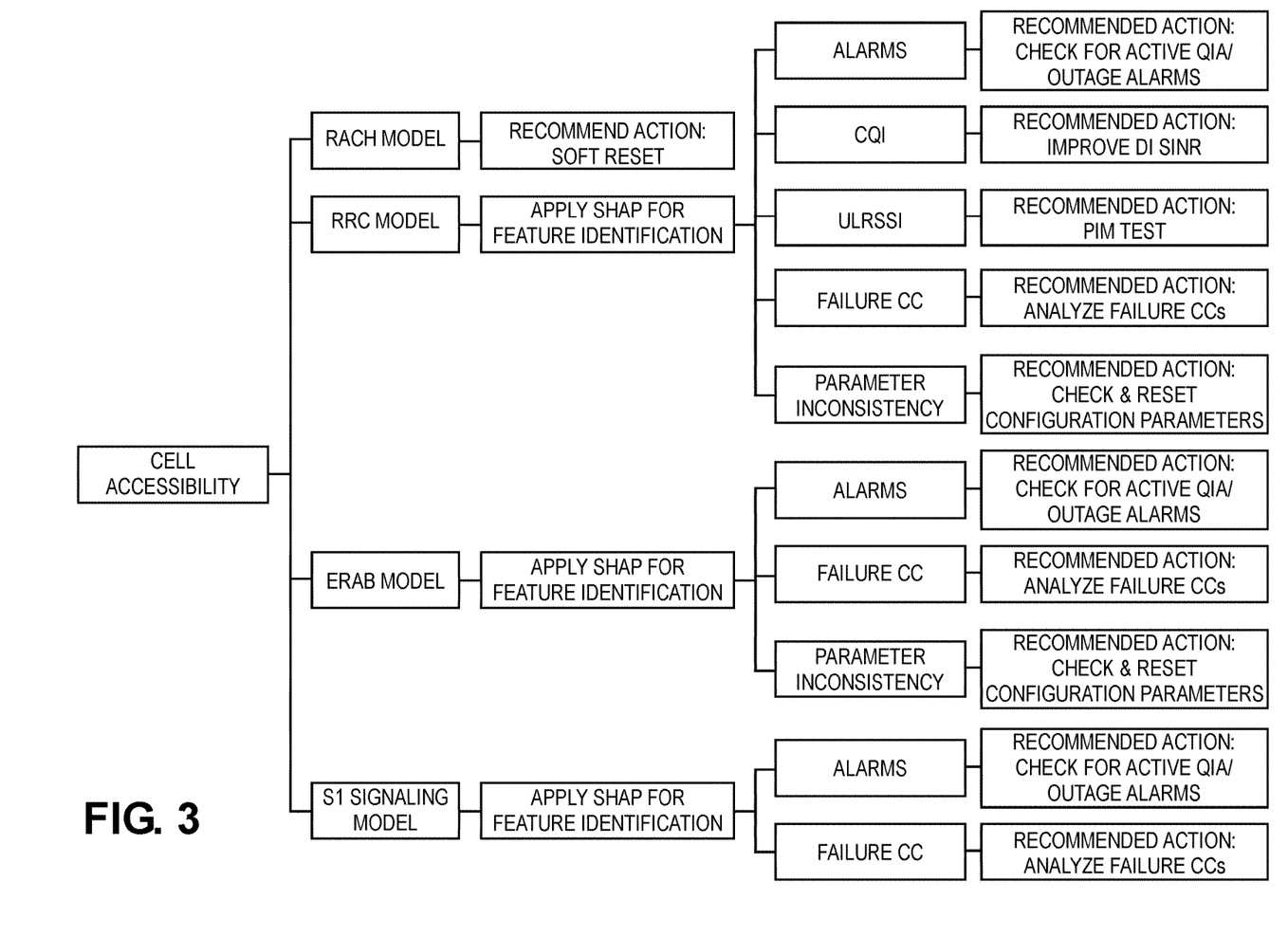
FIG. 3 is a diagram of one embodiment of a root cause decision tree.

The root cause mapper 111 receives any one or more of the outputs of the ML models of the ensemble ML model 107 after processing by the predictor 109. The feature that has highest confidence level. In some embodiments a Tree SHAP (SHapley Additive exPlanations) algorithm is used to find the root cause of the KPI indicating cell accessibility issues. The root cause mapper traverses the decision tree to identify a recommended action to the identified root cause. In some embodiments, this mapping is generated by collecting positive interactions with Network Engineers (SMEs) to identify solutions to the root causes. The decision tree is shown in FIG. 3. FIG. 3 is a diagram of one embodiment of a root cause decision tree. The tree as illustrated has a root for the analysis of 'cell accessibility' indicating that the tree is for determination of cell accessibility issues. The next level of the tree correlates with the four different models of the ensemble model 107. If the prediction unit 109 selects an output of one of the models, then that branch of the tree is traversed. In some embodiments, the outputs of one or more of the models can be applied to the tree and each associated with a root cause. The details associated with a prediction of each model, e.g., the data input into the ensemble model 107 such as the input metrics can be passed along with the prediction to the root cause mapper 111. This data can then be examined to parse out the root cause, such as determining the inputs/features of the RRC model can be examined to identify the alarms, channel quality indicator (CQI), Uplink-Received Signal Strength indicator (ULSRSSI), Failure cause codes (CC), Parameter consistency, or similar input metrics the are correlated with respective correlated recommended action. The recommended action or set of recommended actions can then be output to a recommendation engine 113 (Block 209).

The recommendation engine 113 can apply a set of logic rules to determine whether the recommended action is to be actuated (Block 211). Determination as to whether the action is taken based on predictions is based on following factors confidence Score of each prediction, consecutive count of predictions, and defined logic rules. Where the logic rules indicate actuation of the recommended action, the recommendation engine can implement the recommended action (Block 215). Recommendations like cell lock/unlock, soft reset, parameter tuning, and similar action are activated in conjunction with the mobile network 100 to be actuated on the nodes of mobile network to mitigate the probable accessibility issues. In cases, the recommended action requires manual operations of the network engineers, in which case a notification is sent to the network engineers at the NOC or in a similar fashion. The process of the cell accessibility prediction system can operate continuously with further collection of additional mobile network 100 data (Block 201).

Thus, the embodiments provide a cell accessibility and prediction system with the capability to identify and predict occurrences of cell accessibility issues using machine learning techniques. Automatic implementation of the recommended actions provides a closed loop solution to the NOC User.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 4A:
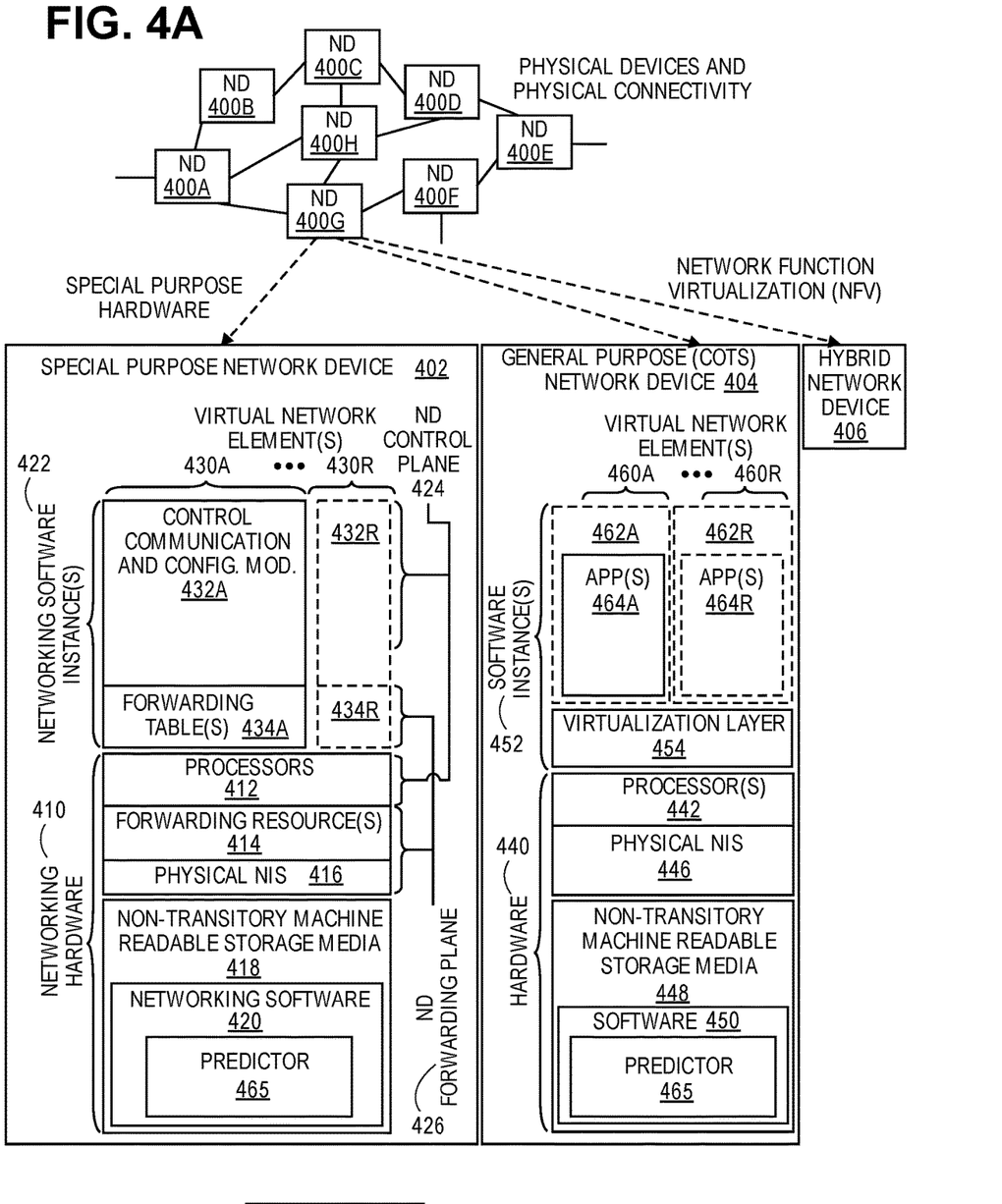
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Networking software 420 can include any combination of the components of the cell accessibility prediction system, referred to here as the predictor 465. Any number of the functions of the cell accessibility prediction system can be implemented at a given special purpose network device 402. Similarly, the any number of the functions of the cell accessibility prediction system can be distributed over multiple electronic or network devices.

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
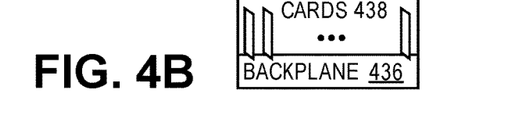
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

Software 450 can include any combination of the components of the cell accessibility prediction system, referred to here as the predictor 465. Any number of the functions of the cell accessibility prediction system can be implemented at a given general purpose network device 402. Similarly, the any number of the functions of the cell accessibility prediction system can be distributed over multiple electronic or network devices.

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 4C:
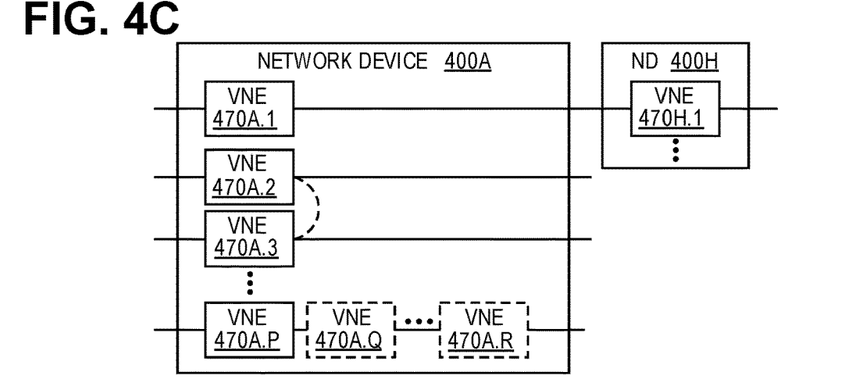
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service— e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the processor(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 4D:
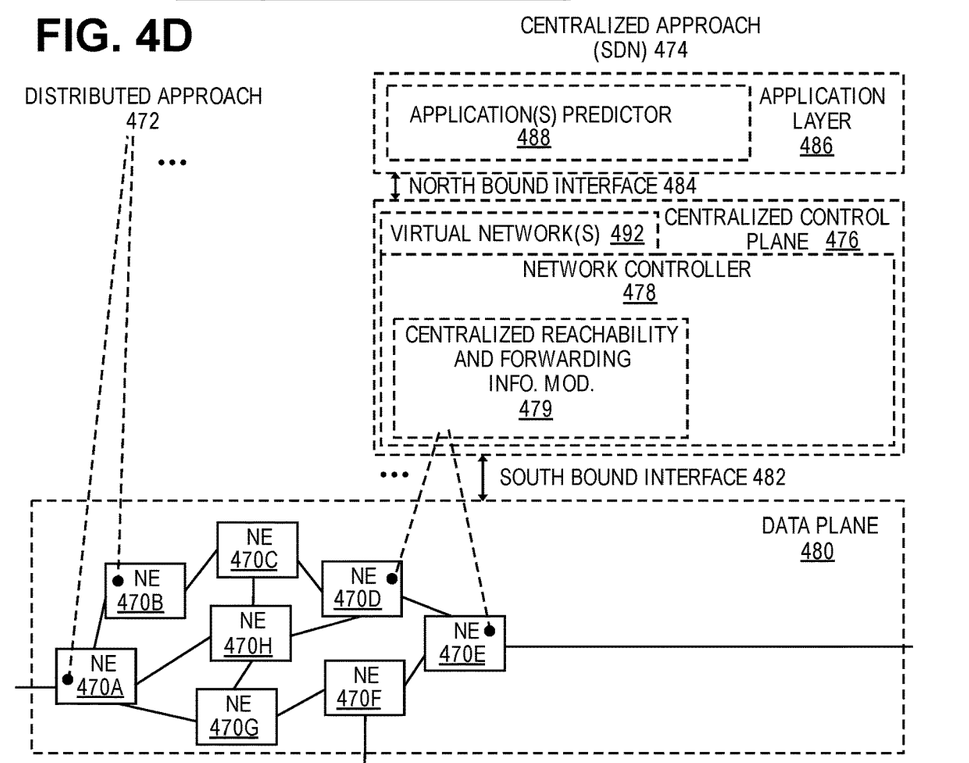
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the processor(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the processor(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

Applications 488 can include any combination of the components of the cell accessibility prediction system, referred to here as the predictor 481. Any number of the functions of the cell accessibility prediction system can be implemented as applications in the application layer 486. Similarly, the any number of the functions of the cell accessibility prediction system can be distributed over multiple electronic or network devices in the SDN.

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
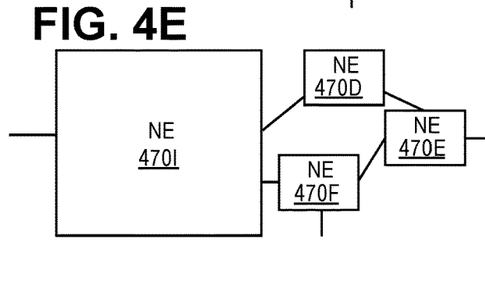
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
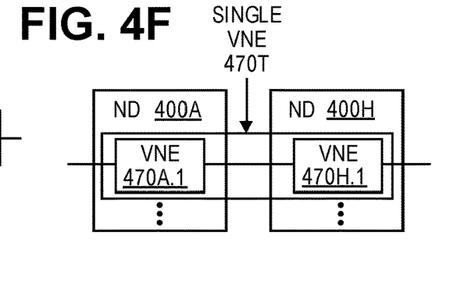
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
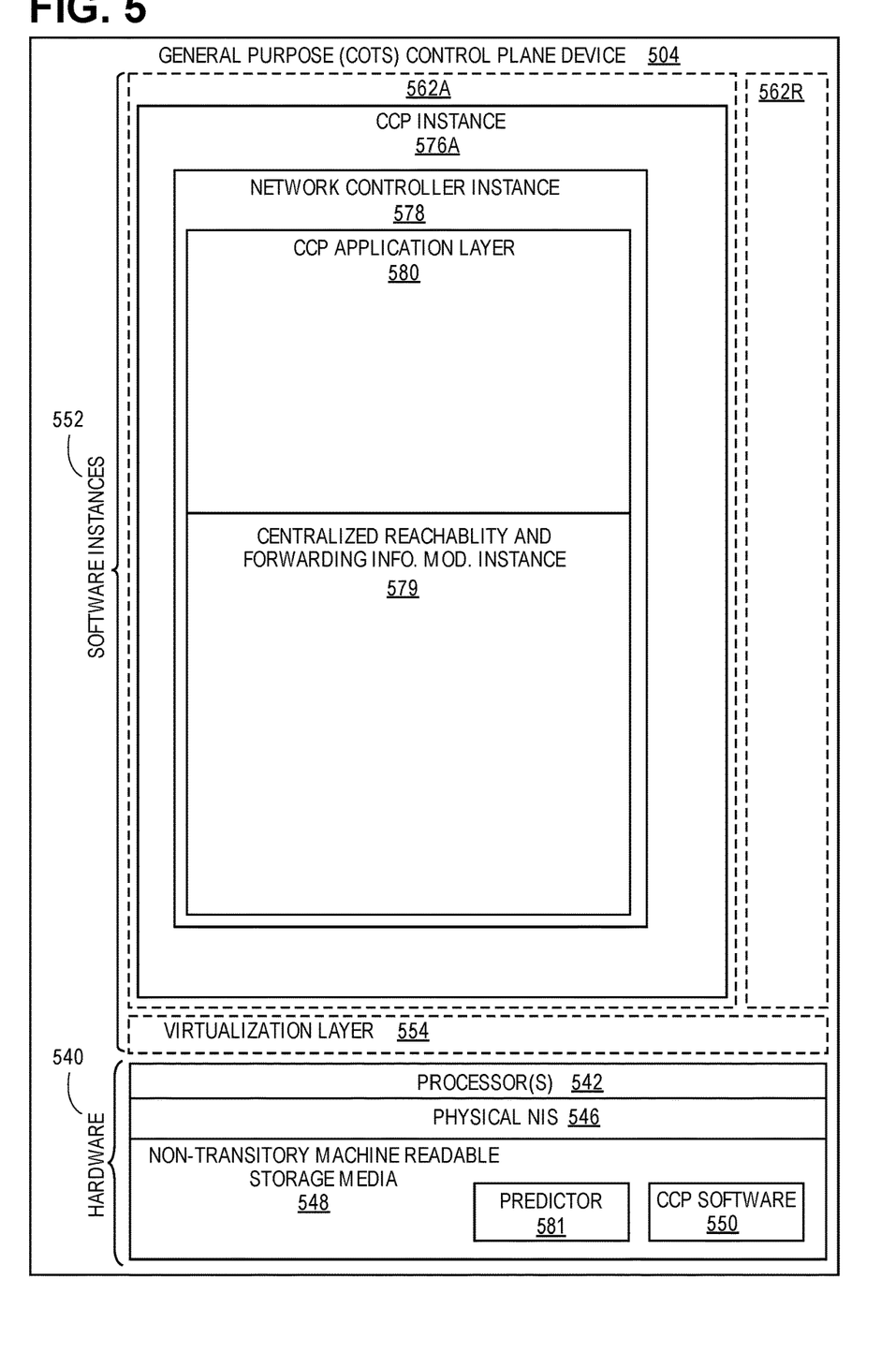
FIG. 5 illustrates a general purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and physical NIs 546, as well as non-transitory machine readable storage media 548 having stored therein centralized control plane (CCP) software 550.

Application layer 580 can include any combination of the components of the cell accessibility prediction system, referred to here as the predictor 581. Any number of the functions of the cell accessibility prediction system can be implemented at a given control plane device 504. Similarly, the any number of the functions of the cell accessibility prediction system can be distributed over multiple electronic or network devices.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (VMM) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for predicting cell accessibility issues for a mobile network, the method comprising:
   receiving a set of metrics from the mobile network;
   processing a set of key performance indicators (KPIs) derived from the set of metrics in an ensemble machine learning model, the ensemble machine learning model including a radio resource channel (RRC) model, a random access channel (RACH) model, an Evolved Universal Telecommunication Systems (UMTS) Terrestrial Radio Access Network (E-UTRAN) Radio Access Bearer (ERAB) model, and an S1 signaling model to generate at least one cell accessibility degradation prediction and a confidence score; and
   applying a root cause mapping to the at least one cell accessibility degradation prediction and the confidence score to identify at least one recommended action to correct a correlated cell accessibility issue.

2. The method of claim 1, further comprising:
   normalizing the received set of metrics including computing moving averages of the set of metrics for multiple preceding time periods.

3. The method of claim 1, further comprising:
   selecting the at least one cell accessibility degradation prediction for the root cause mapping.

4. The method of claim 1, further comprising:
   applying a set of logic rules to the least one recommended action to determine whether to actuate the least one recommended action.

5. The method of claim 4, wherein the set of logic rules are also applied to parameters including prior recommended actions to determine whether to actuate the least one recommended action.

6. The method of claim 1, further comprising:
   applying the root cause mapping to multiple cell accessibility degradation predictions.

7. A non-transitory machine-readable storage medium that provides instructions that, if executed by a processor, will cause said processor to perform operations comprising:
   receiving a set of metrics from a mobile network;
   processing a set of key performance indicators (KPIs) derived from the set of metrics in an ensemble machine learning model, the ensemble machine learning model including a radio resource channel (RRC) model, a random access channel (RACH) model, an Evolved Universal Telecommunication Systems (UMTS) Terrestrial Radio Access Network (E-UTRAN) Radio Access Bearer (ERAB) model, and an S1 signaling model to generate at least one cell accessibility degradation prediction and a confidence score; and applying a root cause mapping to the at least one cell accessibility degradation prediction and the confidence score to identify at least one recommended action to correct a correlated cell accessibility issue.

8. The non-transitory machine-readable storage medium of claim 7, wherein the operations further comprising:
normalizing the received set of metrics including computing moving averages of the set of metrics for multiple preceding time periods.

9. The non-transitory machine-readable storage medium of claim 7, wherein the operations further comprising:
selecting the at least one cell accessibility degradation prediction for the root cause mapping.

10. The non-transitory machine-readable storage medium of claim 7, wherein the operations further comprising:
applying a set of logic rules to the least one recommended action to determine whether to actuate the least one recommended action.

11. The non-transitory machine-readable storage medium of claim 10, wherein the set of logic rules are also applied to parameters including prior recommended actions to determine whether to actuate the least one recommended action.

12. The non-transitory machine-readable storage medium of claim 7, wherein the operations further comprising:
applying the root cause mapping to multiple cell accessibility degradation predictions.

13. An electronic device to for predicting cell accessibility issues for a mobile network, the electronic device comprising:
a machine-readable storage medium having stored there in a cell accessibility predictor; and
a processor coupled to the machine-readable storage medium, the processor to execute the cell accessibility predictor, the cell accessibility predictor to receive a set of metrics from the mobile network, process a set of key performance indicators (KPIs) derived from the set of metrics in an ensemble machine learning model, the ensemble machine learning model including a radio resource channel (RRC) model, a random access channel (RACH) model, an Evolved Universal Telecommunication Systems (UMTS) Terrestrial Radio Access Network (E-UTRAN) Radio Access Bearer (ERAB) model, and an S1 signaling model to generate at least one cell accessibility degradation prediction and a confidence score, and apply a root cause mapping to the at least one cell accessibility degradation prediction and the confidence score to identify at least one recommended action to correct a correlated cell accessibility issue.

14. The electronic device of claim 13, wherein the cell accessibility predictor to further normalize the received set of metrics including computing moving averages of the set of metrics for multiple preceding time periods.

15. The electronic device of claim 13, wherein the cell accessibility predictor to further select the at least one cell accessibility degradation prediction for the root cause mapping.

16. The electronic device of claim 13, wherein the cell accessibility predictor to further apply a set of logic rules to the least one recommended action to determine whether to actuate the least one recommended action.

17. The electronic device of claim 16, wherein the set of logic rules are also applied to parameters including prior recommended actions to determine whether to actuate the least one recommended action.

18. The electronic device of claim 13, wherein the cell accessibility predictor to further applying the root cause mapping to multiple cell accessibility degradation predictions.

* * * * *